(12) United States Patent
Mehr et al.

(10) Patent No.: US 9,978,177 B2
(45) Date of Patent: May 22, 2018

(54) RECONSTRUCTING A 3D MODELED OBJECT

(71) Applicant: Dassault Systemes, Velizy Villacoublay (FR)

(72) Inventors: Eloi Mehr, Velizy Villacoublay (FR); Vincent Guitteny, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 0 days. days.

(21) Appl. No.: 15/391,950

(22) Filed: Dec. 28, 2016

(65) Prior Publication Data

US 2017/0193699 A1    Jul. 6, 2017

(30) Foreign Application Priority Data

Dec. 31, 2015  (EP) .................................. 15307199

(51) Int. Cl.
| | |
|---|---|
| *G06T 17/20* | (2006.01) |
| *G06T 5/00* | (2006.01) |
| *G06F 17/10* | (2006.01) |
| *G06T 7/149* | (2017.01) |

(52) U.S. Cl.
CPC ............ *G06T 17/205* (2013.01); *G06F 17/10* (2013.01); *G06T 5/00* (2013.01); *G06T 7/149* (2017.01); *G06T 2200/24* (2013.01); *G06T 2207/20* (2013.01)

(58) Field of Classification Search
None
See application file for complete search history.

(56) References Cited

U.S. PATENT DOCUMENTS

| | | |
|---|---|---|
| 6,549,201 B1 | 4/2003 | Igarashi et al. |
| 6,654,027 B1 | 11/2003 | Hernandez |
| 8,570,343 B2 | 10/2013 | Halstead |
| 9,886,528 B2 | 2/2018 | Rameau |

(Continued)

FOREIGN PATENT DOCUMENTS

| | | |
|---|---|---|
| CN | 104 794 722 | 7/2015 |
| CN | 105 657 402 | 6/2016 |

(Continued)

OTHER PUBLICATIONS

Sculpteo, "MeshMixer Tutorial Part1 : Modeling for 3D Printing," https://www.youtube.com/watch?v=WwIM4Fp2SgA, May 22, 2015.*

(Continued)

*Primary Examiner* — Nicholas R Wilson
(74) *Attorney, Agent, or Firm* — Hamilton, Brook, Smith & Reynolds, P.C.

(57) ABSTRACT

The invention notably relates to a computer-implemented method for reconstructing a 3D modeled object that represents a real object, from a 3D mesh and measured data representative of the real object, the method comprising providing a set of deformation modes; determining a composition of the deformation modes which optimizes a program that rewards fit between the 3D mesh as deformed by the composition and the measured data, and that further rewards sparsity of the deformation modes involved in the determined composition; and applying the composition to the 3D mesh. The method improves reconstructing a 3D modeled object that represents a real object.

9 Claims, 7 Drawing Sheets

(56) References Cited

U.S. PATENT DOCUMENTS

| | | |
|---|---|---|
| 9,886,530 B2 | 2/2018 | Mehr |
| 2002/0028418 A1 | 3/2002 | Farag |
| 2002/0172413 A1 | 11/2002 | Chen |
| 2003/0206165 A1 | 11/2003 | Hoppe |
| 2005/0033142 A1 | 2/2005 | Madden |
| 2007/0008312 A1 | 1/2007 | Zhou |
| 2009/0202160 A1 | 8/2009 | Kim |
| 2009/0284550 A1 | 11/2009 | Shimada et al. |
| 2011/0295564 A1 | 12/2011 | Chazel |
| 2013/0251241 A1 | 9/2013 | Kunkel |
| 2013/0321403 A1 | 12/2013 | Piemonte |
| 2014/0064581 A1 | 3/2014 | Madbhushi |
| 2014/0267279 A1 | 9/2014 | Kontkanen |
| 2014/0340489 A1 | 11/2014 | Medioni |
| 2014/0358496 A1 | 12/2014 | Rameau et al. |
| 2014/0362091 A1 | 12/2014 | Bouaziz et al. |
| 2015/0142394 A1 | 5/2015 | Mehr et al. |
| 2015/0172628 A1 | 6/2015 | Brown |
| 2015/0213646 A1 | 7/2015 | Ma et al. |
| 2015/0279118 A1 | 10/2015 | Dou et al. |
| 2015/0347846 A1 | 12/2015 | Guzman-Rivera et al. |
| 2016/0127715 A1 | 5/2016 | Shotton et al. |

FOREIGN PATENT DOCUMENTS

| | | |
|---|---|---|
| EP | 0 822 522 | 2/1998 |
| WO | WO 2011/142734 | 11/2011 |
| WO | WO 2012/048304 | 4/2012 |
| WO | WO 2013/189058 | 12/2013 |
| WO | WO 2016/050290 | 4/2016 |

OTHER PUBLICATIONS

Alj, Y. et al., "Multi-Texturing 3D Models: How to Choose the Best Texture?," IC3D Belgium (2012), hal-00785836, Version 1, 8 pages (Feb. 7, 2013).

Allène, C., et al., "Seamless Image-Based Texture Atlases using Multi-band Blending," 4 pages, 2008.

Azariadis, P.N. et al., "Drawing curves onto a cloud of points for point-based modelling," Computer-Aided Design, 37(1): 109-122 (Jan. 1, 2005).

Baumberg, A. "Blending images for texturing 3D models," BMVC 2002, 404-413 (2002).

Bernardini, F. et al., "High-Quality Texture Reconstruction from Multiple Scans," 14 pages, 2001.

Callieri, M., et al., "Masked Photo Blending: mapping dense photographic dataset on high-resolution sampled 3D models," (Jan. 8, 2008).

Canny, J. "A Computational Approach to Edge Detection," IEEE Transactions on Pattern Analysis and Machine Intelligence, PAMI-8(6): 679-698 (Nov. 1986).

Carr, N.A. and Hart, J.C., "Meshed Atlases for Real-Time Procedural Solid Texturing," ACM Transactions on Graphics, 21(2): 26 pages (Apr. 2002).

Clark, X.B. et al., "An Investigation into Graph Cut Parameter Optimisation for Image-Fusion Applications", IVCNZ '12, Dunedin, New Zealand, 6 pages (Nov. 26-28, 2012).

Colburn, A., et al., "Image-Based Remodeling," IEEE Transactions on Visualization and Computer Graphics, 13 pages (2012).

Debevec, P.E., et al.,"Modeling and Rendering Architecture from Photographs: A hybrid geometry- and image-based approach," Presented at Computer Graphics Proceedings, Annual Conference Series, New Orleans, Lousiana, pp. 11-20 (Aug. 4-9, 1996).

Dellepiane, M., et al., "Flow-based local optimization for image-to-geometry projection," IEEE Transactions on Visualization and Computer Graphics, pp. 1-12, 2012.

Dutton, R.D., et al., "Efficiently Identifying the Faces of a Solid," Computers and Graphics, 7:(2):143-147 (1983).

Dutagaci, H., et al., "Evaluation of 3D interest detection techniques via human-generated ground truth," Vis Comput 28: 901-917; Jun. 29, 2012.

Eisemann, M. et al., "Floating Textures," Eurographics, 27(2): 10 pages (2008).

European Search Report and Written Opinion for European Application No. EP13305751, completed Oct. 28, 2013.

European Search Report for European Application No. EP13306576 entitled "Computing Camera Parameters," completed Mar. 26, 2014.

Fabbri, R. et al., "3D Curve Sketch: Flexible Curve-Based Stereo Reconstruction and Calibration," 2010 IEEE Conference on Computer Vision and Pattern Recognition (CVPR), Jun. 13-18, 2010, San Francisco, CA, USA, pp. 1538-1545.

Goldlücke, B. and Cremers, D., "A Superresolution Framework for High-Accuracy Multiview Reconstruction," 10 pages, 2014.

Hanrahan, P., "Creating Volume Models from Edge-Vertex Graphs," Proceedings of the 9th Annual Conference on Computer Graphics and Interactive Techniques, Siggraph '82, vol. 16, 1982, pp. 77-84.

Hanusch, T., "A New Texture Mapping Algorithm for Photorealistic Reconstruction of 3D Objects," The International Archives of the Photogrammetry, Remote Sensing and Spatial Information Sciences, Beijing, vol. XXXVII(Part B5): 699-706 (2008).

Inoue, K., et al., "Solid Model Reconstruction of Wireframe CAD Models Based on Topological Embeddings of Planar Graphs," 2003.

Ishikawa, H., "Higher-Order Clique Reduction in Binary Graph Cut," IEEE, pp. 2993-3000 (2009).

Jian-dong, Z. et al., "3D curve structure reconstruction from a sparse set of unordered images," Computers in Industry, 60(2): 126-134 (Feb. 1, 2009).

Kappes, J.H. et al., "A Comparative Study of Modern Inference Techniques for Discrete Energy Minimization Problems," 8 pages, 2013.

Komodakis, N., et al.,. "Image Completion Using Efficient Belief Propagation Via Priority Scheduling and Dynamic Pruning," *IEEE Transactions on Image Processing* 2007.

Komodakis, N., et al., "MRF Optimization via Dual Decomposition: Message Passing Revisited," *IEEE Trans.* 2011.

Komodakis, N., "Image Completion Using Global Optimization," CVPR 2006.

Kolmogorov, V.. "Convergent Tree-Reweighted Message Passing for Energy Minimization," *Pattern Analysis and Machine Intelligence, IEEE* 2006.

Kuo, M.H., "Automatic extraction of quadric surfaces from wireframe models," Computers & Graphics, 25:1, Feb. 2001 (Feb. 2001).

Kurazume, R., et al., "Simultaneous 2D images and 3D geometric model registration for texture mapping utilizing reflectance attribute," Presented at The 5th Asian Conference on Computer Vision, Melbourne, Australia, pp. 1-8 (Jan. 23-25, 2002).

Larue, F. et al., "Automatic Texturing without Illumination Artifacts from In-hand Scanning Data Flow," Artifacts Free Automatic Texturing for In-Hand Scanning, pp. 1-13, 2012.

Lavoue, G., et al., "Markov Random Fields for Improving 3D Mesh Analysis and Segmentation," Eurographics Workshop on 3D Object Retrieval (2008).

Lee, Chang H., et al., "Mesh Saliency," Dept. of Computer Science, University of MD, 2005.

Lee, J., et al., "Interactive Retexturing from Unordered Images," 2014 11th International Conference on Ubiquitous Robots and Ambient Intelligence, pp. 18-21 (Nov. 12, 2014).

Lempitsky, V. and Ivanov, D., "Seamless Mosaicing of Image-Based Texture Maps," 6 pages, 2007.

Lensch, H.P.A. et al., "Automated Texture Registration and Stitching for Real World Models," 13 pages, 2000.

Lévy, B. et al., "Least Squares Conformal Maps for Automatic Texture Atlas Generation," 10 pages, 2002.

Lourakis, M.I.A. and Argyros, A.A., "SBA: A Software Package for Generic Sparse Bundle Adjustment," ACM Transactions on Mathematical Software, 36(1): pp. 2:1-2:30 (Mar. 2009).

Moslah, O. et al., "Geo-Referencing Uncalibrated Photographs using Aerial Images and 3D Urban Models," 6 pages (Jan. 1, 2009).

Moslah, O. et al., "Urban Models Texturing from Un-Calibrated Photographs," IVCNZ, 23rd International Conference, IEEE, Piscataway, NJ pp. 1-6 (Nov. 26, 2008).

(56) References Cited

OTHER PUBLICATIONS

Reisner-Kollmann, I. et al., "Interactive reconstruction of industrial sites using parametric models," Proceedings of the 26th Spring Conference on Computer Graphics, SCCG '10, Jan. 1, 2010, p. 101.
Rocchini, C., et al., "Multiple Textures Stitching and Blending on 3D Objects," Istituto di Elaborazione dell'Informazione, 13 pages, 1999.
Štencel, M. and Janáček, J., "On Calculation of Chamfer Distance and Lipschitz Covers in Digital Images," 6 pages, 2006.
Surazhsky, T. et al., "A Comparison of Gaussian and Mean Curvatures Estimation Methods on Triangular Meshes," 6 pages, 2003.
Van Den Hengel, A. et al., "Video Trace: Rapid interactive scene modelling from video," ACM Transactions on Graphics, 26(3): 86-1-86-5 (Jul. 29, 2007).
Varady, T. et al, "Reverse Engineering of Geometric Models—An Introduction," Computer-Aided Design, 29(4): 255-268 (Apr. 1, 1997).
Wang, L. et al., "Optimal Texture Map Reconstruction from Multiple Views," 8 pages, 2001.
Wu, H. et al., "Photogrammetric reconstruction of free-form objects with curvilinear structures," Visual Comput, 21(2): 203-216 (May 1, 2005).
Xu, L., et al., "A General Texture Mapping Framework for Image-based 3D Modeling," 2010 Proceedings of 17th IEEE International Conference on Image Processing, 2010, pp. 2713-2716.
Zhang, E. et al., "Feature-Based Surface Parameterization and Texture Mapping," ACM Transactions on Graphics, 24(1): 1-27 (Jan. 2005).
Zhang, Z., "A Flexible New Technique for Camera Calibration," Microsoft Corporation, Technical Report MSR-TR-98-71, 22 pages (Dec. 2, 1998).
Zhou, K. et al., "TextureMontage: Seamless Texturing of Arbitrary Surfaces From Multiple Images," 8 pages, 2005.
Chen, T., et al, "3-Sweep: Extracting Editable Objects from a Single Photo," SIGGRAPH Asia, 2013.
Autodesk 123D Catch; "123D Catch is a free app that lets you create 3D scans of virtually any object" www.123dapp.com/catch ; retrieved from Internet Jan. 14, 2016.
Wu, C., "VisualSFM: A Visual Structure from Motion System" http://homes.cs.washington.edu/~ccwu/vsfm/ ; retrieved from Internet Jan. 14, 2016.
Acute3D Capturing Reality; "Capturing reality with automatic 3D photogrammetry software" http://www.acute3d.com; retrieved from Internet Jan. 8, 2016.
Alexandre, L.A., "3D Descriptors for Object and Category Recognition: a Comparative Evaluation," IROS 2012.
Anguelov, D., et al., "SCAPE: Shape Completion and Animation of People," SIGGRAPH 2005.
Barbic, J., and James, D.L., "Real-Time Subspace Integration for St. Venant-Kirchhoff Deformable Models," SIGGRAPH 2005.
Barron, et al., "Shape, Illumination and Reflectance from Shading," EECS, 2013.
Calakli, F., and Taubin, G., "SSD: Smooth Signed Distance Surface Reconstruction," Pacific Graphics 2011.
Chen, Y., and Cipolla, R., "Single and Sparse View 3D Reconstruction by Learning Shape Priors," CVIU Journal 2011.
Cui, Y., et al., "3D Shape Scanning with a Time-of-Flight Camera," CVPR 2010.
Duncan, K., et al., "Multi-scale Superquadric Fitting for Efficient Shape and Pose Recovery of Unknown Objects," ICRA 2013.
Eitel, A., et al., "Multimodal Deep Learning for Robust RGB-D Object Recognition," International Conference on Intelligent Robots and Systems, 2015.
Eitz, M., et al., "Sketch-Based Shape Retrieval," SIGGRAPH, 2012.
Engel, J., et al., "LSD-SLAM: Large-Scale Direct Monocular SLAM," CVPR2014.
Faugeras, O., "Three-Dimensional Computer Vision: A Geometric viewpoint," MIT Press 1994.
Freifeld, O. and Black, M.J., "Lie Bodies: A Manifold Representation of 3D Human Shape," ECCV 2012.
Furukawa, Y., et al. "Towards Internet-scale Multi-view Stereo," CVPR 2010.
Hartley, R., and Zisserman, A., "Multiple View Geometry in Computer Vision," Cambridge Univ. Press 2004.
Hildebrandt, K., et al., "Eigenmodes of Surface Energies for Shape Analysis," Advances in Geometric Modeling and Processing 2012.
Newcombe, et al. "KinectFusion: Real-Time Dense Surface Mapping and Tracking," Symposium ISMAR 2011.
Kazhdan, M., et al. "Poisson Surface Reconstruction," Eurographics Symposium on Geometry Processing 2006.
Koutsourakis, P., et al., "Single View Reconstruction Using Shape Grammars for Urban Environments," ICCV 2009.
Li, Y., et al., "Database-Assisted Object Retrieval for Real-Time 3D Reconstruction," EUROGRAPHICS, 2015.
Mairal, J., "Sparse Modeling for Image and Vision Processing, Foundations and Trends in Computer Graphics and Vision," 2014.
Nelder, J., and Mead, R., "A Simplex Method for Function Minimization," Computer Journal 1965.
Newcombe, R., et al., "Live Dense Reconstruction with a Single Moving Camera," IEEE ICCV2011.
Prados, et al., "Shape from Shading ," Handbook of Mathematical Models in Computer Vision, 2006.
"Reconstruct your world with ReconstructMe", reconstructme.net; retrieved from Internet Jan. 14, 2016.
Rother, C., et al., "GrabCut—Interactive Foreground Extraction using Iterated Graph Cuts," SIGGRAPH 2004.
Rusu, R.B., et al., "Fast Point Feature Histograms (FPFH) for 3D Registration," ICRA 2009.
SDK for Kinect, KinectFusion, http://www.microsoft.com retrieved from Internet Jan. 14, 2016.
Sifakis, E.D., "FEM Simulation of 3D Deformable Solids: A Practitioner's Guide to Theory, Discretization and Model Reduction," SIGGRAPH 2012 Course.
Szeliski, R., "Computer Vision: Algorithms and Applications," Edition Springer 2010.
Oswald, M., et al., "Fast and Globally Optimal Single View Reconstruction of Curved Objects," CVPR, 2012.
Tombari, T., et al., "Unique Signatures of Histograms for local Surface Description," ECCV 2010.
Wohlhart, P., and Lepetit, V., "Learning Descriptors for Object Recognition and 3D Pose Estimation," Computer Vision and Pattern Recognition, 2015.
Zheng, et al., "Interactive Images: Cuboid Proxies for Smart Image Segmentation," SIGGRAPH, 2012.
Kolomenkin, M., "On Edge Detection on Surfaces", IEEE, 2009.
Krizhevsky, A., et al., "ImageNet Classification with Deep Convolutional Neural Networks," Advances in Neural Information Processing Systems. 2012.
Loper, M, et al., "OpenDR: An Approximate Differentiable Renderer." European Conference on Computer Vision. Springer International Publishing, 2014.
Chen, Y., et al,. "Tensor-Based Human Body Modeling," Proceedings of the IEEE Conference on Computer Vision and Pattern Recognition. 2013.
Bălan, A., et al., "The Naked Truth: Estimating Body Shape Under Clothing." European Conference on Computer Vision. Springer Berlin Heidelberg, 2008.
Bălan, A., et al. "Detailed Human Shape and Pose From Images." 2007 IEEE Conference on Computer Vision and Pattern Recognition. IEEE, 2007.
Guan, P., et al. "Estimating Human Shape and Pose From a Single Image." 2009 IEEE 12th International Conference on Computer Vision. IEEE, 2009.
Weiss, A., et al., "Home 3D Body Scans From Noisy Image and Range Data." 2011 International Conference on Computer Vision. IEEE, 2011.
Perbet, F., et al. "Human Body Shape Estimation Using a Multi-Resolution Manifold Forest." Proceedings of the IEEE Conference on Computer Vision and Pattern Recognition. 2014.

(56) References Cited

OTHER PUBLICATIONS

Gschwandtner, M., et al., "BlenSor: Blender Sensor Simulation Toolbox", Advances in Visual Computing: 7th International Symposium, vol. 6939/2011 pp. 199-208, 2011.

Nguyen, C., et al., "Modeling Kinect Sensor Noise for Improved 3D Reconstruction and Tracking", 2012 Second Joint 3DIM/3DPVT Conference: 3D Imaging, Modeling, Processing, Visualization & Transmission, IEEE, 2012.

Chatterjee, A., et al., "Noise in Structured-Light Stereo Depth Cameras: Modeling and its Applications", Dept. of Engineering, Indian Institute of Science, Bengaluru, May 8, 2015.

Belhedi, A., et al., "Noise Modelling and Uncertainty Propagation for TOF Sensors", International Conference of Computer Vision, 2012.

Zeng, M., et al. "Dynamic Human Surface Reconstruction Using a Single Kinect", 13th International Conference on Computer-Aided Design and Computer Graphics, 2013.

Leizea, I., et al. "Real-time Deformation, Registration and Tracking of Solids Based on Physical Simulation", IEEE International Symposium on Mixed and Augmented Reality, Science and Technology Proceedings, Sep. 10-12, 2014.

Zollhöfer, M., et al. "Real-time Non-rigid Reconstruction using an RGB-D Camera", ACM Transactions on Graphics, vol. 22, No. 4, Article 156, Jul. 2014.

Leizea, I., et al., "Development and Improvement of Optical Tracking Methods towards Registering the Deformations of 3D Non-Rigid Bodies in Real Time for Augmented Reality Applications", Ph.D. Thesis, pp. 1-314, Feb. 2015.

EP Search Report for EP 15 30 7199 dated Jun. 17, 2016 entitled "Reconstructing a 3D Modeled Object".

European Search Report for EP 16 18 8268 dated Feb. 21, 2017.

Handa, A., et al., "A Benchmark for RGB-D Visual Odometry, 3D Reconstruction and SLAM", 2014 IEEE International Conference on Robotics and Automation (ICRA), IEEE, pp. 1524-1531, May 31, 2014.

Handa, A., et al., "Understanding Real World Indoor Scenes with Synthetic Data", 2016 IEEE Conference on Computer Vision and Pattern Recognition (CVPR), IEEE, pp. 4077-4085, Jun. 27, 2016.

Xu, K., et al., "Data-Driven Shape Analysis and Processing" Computer Graphics Forum, pp. 1-27, Feb. 24, 2015.

Shotton, J., et al., "Real-Time Human Pose Recognition in Parts from Single Depth Images", Communications of the ACM, vol. 56, No. 1, Jan. 2013.

Salamati, N., et al. "Incorporating Near-Infrared Information into Semantic Image Segmentation", CORR, Jun. 24, 2014.

Krahenbuhl, P., et al. "Efficient Inference in Fully Connected CRFs with Gaussian Edge Potentials" Computer Science Department, Stanford University, May 12, 2017.

Hoegner, L., et al. "Towards People Detection from Fused Time-of-Flight and Thermal Infrared Images" International Archives of the Photogrammetry, Remote Sensing and Spatial Information Sciences, vol. X1-3, Aug. 11, 2014.

European Search Report for EP 16 30 6860 dated May 19, 2017.

European Search Report for EP 16 30 6838 dated Jul. 20, 2017.

Sahu, T., et al. , "Image Enhancement Based on Abstraction and Neural Network", International Journal of Scientific Engineering and Technology, pp. 2277-1581148. Apr. 2012.

Landau, M., et al., "Simulating Kinect Infrared and Depth Images", IEEE Transactions of Cybernetics, vol. 46, No. 12, pp. 3018-3031; Nov. 13, 2015.

Ley, A., et al., SyB3R: A Realistic Synthetic Benchmark for 3D Reconstruction from Images, Network and Parallel Computing, pp. 23-251, Sep. 16, 2016.

\* cited by examiner

RECONSTRUCTING A 3D MODELED OBJECT

RELATED APPLICATION(S)

This application claims priority under 35 U.S.C. § 119 or 365 to Europe, Application No. 15307199.8, filed Dec. 31, 2015. The entire teachings of the above application(s) are incorporated herein by reference.

FIELD OF THE INVENTION

The invention relates to the field of computer programs and systems, and more specifically to a method, system and program for reconstructing a 3D modeled object that represents a real object.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this framework, the field of computer vision and computer graphics offers technologies which are more and more useful. Indeed, this field has applications to 3D reconstruction, 3D model texturing, virtual reality and all domains where it is necessary to precisely build a 3D scene with exact geometry using as input, for example, the information in a one or more photographs. 3D reconstruction can be used in any field which involves the creation of (e.g. textured) 3D models, such as serious gaming, video games, architecture, archeology, reverse engineering, 3D asset database, or virtual environments.

3D reconstruction from video stream and photograph set analysis is addressed in two different approaches in the state of the art, depending on the type of sensors used for the input data. The first approach uses "receiver" sensors. This notably concerns 3D reconstruction from RGB images analysis. Here, 3D reconstruction is obtained by multi-view analysis of RGB color information contained in each of the image planes. The following papers relate to this approach: "R. Hartley and A. Zisserman: *Multiple View Geometry in Computer Vision*, Cambridge Univ. Press 2004", "R. Szeliski: Computer Vision: *Algorithms and Applications*, Edition Springer 2010", and "Faugeras: *Three-Dimensional Computer Vision: A Geometric viewpoint*, MIT Press 1994". The second approach uses "emitter-receiver" sensors. This notably concerns 3D reconstruction from RGB-Depth images analysis. This kind of sensors gives additional depth data to standard RGB data, and it is depth information that is mainly used in the reconstruction process. The following papers relate to this approach: "Yan Cui et al.: *3D Shape Scanning with a Time-of-Flight Camera*, CVPR 2010", "R S. Izadi et al.: *KinectFusion: Real-Time Dense Surface Mapping and Tracking*, Symposium ISMAR 2011", and "R. Newcombe et al.: *Live Dense Reconstruction with a Single Moving Camera*, IEEE ICCV2011". Moreover, several academic and industrial players now offer software solutions for 3D reconstruction, by RGB image analysis, such as Acute3D, Autodesk, VisualSFM, or by RGB-Depth analysis, such as ReconstructMe or Microsoft's SDK for Kinect (registered trademarks). Multi-view photogrammetry reconstruction methods use the sole information contained in the image plans of a video sequence (or a series of snapshots) in order to estimate 3D geometry of the scene. The matching of interest points between different ones of the 2D views yields the relative positions of the camera. An optimized triangulation is then used to compute the 3D points corresponding to the matching pair. Depth-map analysis reconstruction methods are based on disparity maps or approximated 3D point clouds. Those disparity maps are obtained using stereovision or structured light (see the 'Kinect' device for example) or 'Time of Flight' 3D-cameras. These state-of-the-art reconstruction methods then typically output a discrete 3D representation of the real object, most often a 3D mesh. The 3D model derives from the eventual volume closing off the resulting 3D point cloud.

Within this field, 3D reconstruction using only a single view has also been a specific topic of interest, because this specific approach allows a globally easy (and thus fast) process. An idea is to infer the 3D using only a single RGB frame, exploiting several hints such as shading (e.g. the algorithms disclosed in paper "Prados et al, *Shape from Shading*, in Handbook of Mathematical Models in Computer Vision, 2006"), textures (e.g. so-called "Shape from Texture algorithms"), contour drawing (e.g. so-called "Shape from Silhouette" algorithms). The use of a single depth frame in particular for the reconstruction is a recent topic, thanks to consumer depth sensors having appeared very recently on the market. The goal is to use a single depth frame of an object to build a complete 3D model of this object. Using several depth frames makes the problem much easier, because one can align each frame with the other frames in order to get a complete 3D point cloud of the object, and then use a surface reconstruction algorithm, such as the one disclosed in paper "Michael Kazhdan, Matthew Bolitho, and Hughes Hoppe, *Poisson Surface Reconstruction*, in Eurographics Symposium on Geometry Processing 2006" or paper "F. Calakli, and G. Taubin, SSD: *Smooth Signed Distance Surface Reconstruction*, in Pacific Graphics 2011". But it remains very hard to build a complete 3D model of an object using only a single depth frame, because a depth frame only represents a limited part of the object to reconstruct. This is why one often has to involve manual interactions (e.g. as disclosed in paper "Chen et al, *3-Sweep: Extracting Editable Objects from a Single Photo*, in SIGGRAPH ASIA, 2013") or impose strong constraints on the object to reconstruct in order to infer the complete model of the object. One such constraint can be to impose a limited space of shapes on the object to reconstruct. Paper "Kester Duncan, Sudeep Sarkar, Redwan Alqasemi, and Rajiv Dubey, *Multi-scale Superquadric Fitting for Efficient Shape and Pose Recovery of Unknown Objects*, in ICRA 2013" for instance discloses fitting a superquadric (defined by five intrinsic parameters) on the point cloud back-projected from the depth map. Because the space of shapes is very limited (five parameters only), it is easy to fit a superquadric on a partial point cloud. These specific parameters define a whole superquadric, and one can thus infer the complete shape of the object using only a partial depth view of the object. Paper "Zheng et al, *Interactive Images: Cuboid Proxies for Smart Image Segmentation*, in SIGGRAPH, 2012" discloses the use of cuboids instead of superquadrics in order to achieve a similar goal. This idea has been extended, in the context of urban environments reconstructions, using a more evolved space of shapes, defined by the assemblies of simple components (e.g. cubes, bricks, cylinders). A grammar defines the rules allowing to assemble several components to build a plausible shape. The grammar is specific to the context and the kinds of objects one wants to be able to reconstruct. For instance such a parametric space has been applied using a single RGB frame, as disclosed in paper "Panagiotis Koutsourakis, Loïc Simon, Olivier Teboul, Georgios Tziritas, and Nikos Paragios, *Single View Reconstruction Using Shape Grammars for Urban Environments*, in ICCV 2009" (in the context of urban environments reconstructions). Another idea consists in learning a limited space of shapes, and thus learning the natural constraints of a specific class of objects. When humans see a picture of car, they are able to recognize this car and infer the non-visible part of this car, because a car is a very specific object. Some algorithms leverage this idea, learning the space of shapes for a specific class of objects in order to reconstruct the object using only a single partial view. Papers "Dragomir Anguelov, Praveen Srinivasan, Daphne Koller, Sebastian Thrun, Jim Rodgers, and James Davis, *SCAPE: Shape Completion and Animation of People*, in SIGGRAPH 2005" and "Oren Frefeld, and Michael J. Black, *Lie Bodies: A Manifold Representation of 3D Human Shape*, in ECCV 2012" suggest to learn the space of human bodies, and then to reconstruct a complete person with only a single depth frame of this person. A similar idea is used in paper "Yu Chen, and Roberto Cipolla, *Single and Sparse View 3D Reconstruction by Learning Shape Priors*, in CVIU Journal 2011" to reconstruct some CAD objects using only the silhouette of the object.

Within this context, there is still a need for an improved solution for reconstructing a 3D modeled object that represents a real object.

SUMMARY OF THE INVENTION

It is therefore provided a computer-implemented method for reconstructing a 3D modeled object that represents a real object, from a 3D mesh and measured data representative of the real object. The method comprises providing a set of deformation modes. The method also comprises determining a composition of the deformation modes which optimizes a program that rewards fit between the 3D mesh as deformed by the composition and the measured data, and that further rewards sparsity of the deformation modes involved in the determined composition. And the method comprises applying the composition to the 3D mesh.

The method may comprise one or more of the following:
the set of deformation modes comprises a subset representative of geometrical modes that includes the rigid mode and the 3D scaling mode;
the set of deformation modes further comprises a subset representative of at least one physics mode;
the subset of at least one physics mode includes at least one material eigenmode;
the material is a Saint Venant-Kirchhoff material;
the subset representative of at least one physics mode includes a number of the lowest eigenvectors; and/or
the program comprises a term of the type $\mu\varphi(\theta)$ with $$\varphi(\theta) = \left( \sum_{i=1}^{p} \left| \frac{\alpha_i}{s(A)} \right| \right),$$

where $s(J)=\max(|\inf J|, |\sup J|)$ and coefficients $\alpha_i$ are the coefficients of the at least one physics mode.

It is further provided a 3D modeled object that represents a real object, the 3D modeled object being obtainable (e.g. obtained) by the method.

It is further provided a computer program comprising instructions for performing the method.

It is further provided a computer readable storage medium having recorded thereon the 3D modeled object and/or the computer program.

It is further provided a system comprising a processor coupled to a memory and a graphical user interface, the memory having recorded thereon the computer program.

It is further provided a method of manufacturing a product. The manufacturing method comprises providing a 3D modeled object as described above and that represents the product (to be manufactured). Providing the 3D modeled object means that computer-modeled specifications (i.e. the 3D modeled object) are available, said specifications being obtainable by the 3D reconstruction method, whether directly following the execution of the 3D reconstruction method (which may thus be comprised in the manufacturing method), or retrieved afterwards after the 3D modeled object was stored and/or received from another user or workstation. The manufacturing method then comprises producing the product based on the 3D modeled object. This may mean that the specifications of the 3D modeled object are read and followed by a machine and/or a user using a machine to produce a real object that corresponds to the 3D modeled object (at least in terms of geometry, e.g. with a relative error of at most 5%).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

Figure 1:
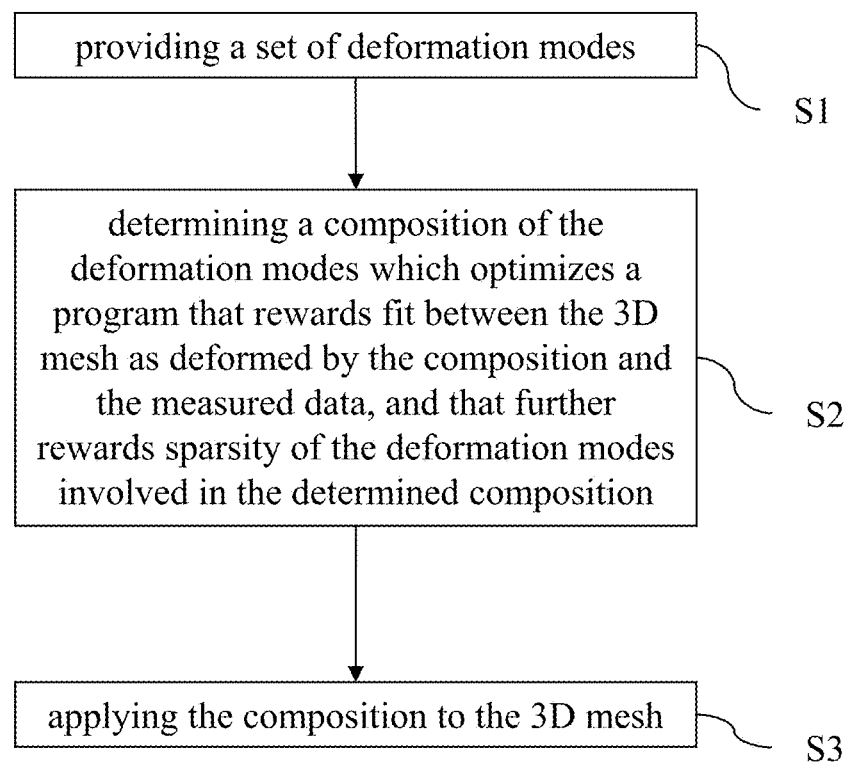
FIG. 1 shows a flowchart of an example of the method.

With reference to the flowchart of FIG. 1 (which shows method steps in a sequence, being noted that this is merely for a purpose of illustration as the different computations executed by the method can be performed in a parallel and/or interlaced fashion, as general and known per se from the field of computer science), it is proposed a computer-implemented method (i.e. method executed on a computer system or the like, which means that each action executed by the method is related to respective one or more computations performed by a processor coupled to a memory) for reconstructing (i.e. designing a 3D modeled object based on measurements, e.g. obtained—previously to or within the method—via one or more sensors of physical signals, e.g. receiver sensor and/or emitter-receiver sensors, based on a physical instance of the real object) a 3D modeled object (i.e. any computer data that allows a 3D representation, which is, in the present context, the 3D mesh as eventually deformed by the composition) that represents a real object (i.e. any physical object or product, such as manufacturing product or a part, e.g. a consumer good, a mechanical part, or an assembly thereof) from a 3D mesh and measured data representative of the real object (said 3D mesh and measured data being thus input of the method of FIG. 1, predetermined to the method or obtained within the execution of the method, e.g. the 3D mesh being then modified by the applying S3). The method comprises providing S1 a set of deformation modes. The method also comprises determining S2 a composition (in the very large mathematical meaning of function compositions) of the deformation modes which optimizes a program that rewards fit between the 3D mesh as deformed by the composition and the measured data (i.e. the program penalizes the eventually determined composition being a result far—i.e. opposite to fitting—from the initial measurement input, i.e. the measured data, the extent of fitting being evaluated with respect to a geometrical and/or topological distance—e.g. the distance being predetermined or determined within the method), and that further rewards sparsity of the deformation modes involved in the determined composition. And the method comprises applying S3 the composition to the 3D mesh (i.e. deforming the 3D mesh according to the optimal composition determined at S2, which encompasses modifying the data defining the 3D mesh and/or creating a modified version of such data, this being a detail of implementation). Such a method improves the reconstruction of a 3D modeled object that represents a real object.

Notably, the method falls within the field of 3D reconstruction and allows eventually obtaining a 3D modeled object that represents a real object (as a 3D mesh, that is, the 3D mesh as deformed by the method), based on measurements (i.e. the measured data representative of the real object). Now, because the applying S3 is based on determining at S2 a composition of the deformation modes which optimizes a program that rewards fit between the 3D mesh as deformed by the composition and the measured data, the method may provide a flexibility in the exploration of potential results and thereby arriving at a relatively accurate result. This proves useful notably when the measured data include (or yet strictly consist of) a single RGB-depth image of the real object (or more generally a single one of any sensor-based 3D image of the real object, such as a mere depth image of the real object, or yet an optical-sensor 3D image of the real object). In this case, the framework of the method allows arriving at a relevant result, even though the initial information is sparse, noisy and/or inaccurate (e.g. the initial measured data providing a representation of the real object that comprises occlusions and/or noise). For example, the deformation modes provided at S1 involve variable parameters (whose values are thus explored at S2, at least for those deformation modes eventually involved in the determined composition, such involvement of a respective deformation mode amounting in an implementation to a dedicated variable parameter of the respective deformation mode). The determination S2 thereby amounts to exploring deformation modes and/or values of variable parameters thereof, thus achieving an optimal result (which is not only an optimal set of deformation modes but also optimal parameter values thereof and yet also an optimal way to compose the optimal deformation modes), the term "optimum" designating, as widely known in the field of mathematics applied to computer science, not only a true optimum but also a pseudo-optimum (e.g. a local optimum) provided by a heuristic algorithm (e.g. in case the problem is computationally relatively highly complex). Thus, the flexibility may typically induce relatively high computational costs. For example, the explored compositions can be numerous (which may be due to a high number of deformation modes in the provided set and/or to a high number of potential values for the variable parameters involved in the composition), with for example the set of deformation modes comprising at least four (or even six) deformation modes (e.g. in addition to the later-mentioned rigid mode and/or the 3D scaling mode) which each comprise, respectively, at least 1000 (or even 10000) or yet a continuum of instances (i.e. an "instance" designating specific values for the variable parameters of a given deformation mode, an explored solution for the optimization program underlying S2 being thus a composition of instances of the deformation modes provided at S1, such that an instance can also be referred shortly to as "explored deformation mode", any such instance being a potential candidate for the eventually applied composition). For example, the exploration of the compositions at S2 may amount to the exploration of optimal real values for at least five, ten parameters, or even twenty parameters (e.g. in a continuum domain of real numbers). Nonetheless, the method can be executed with relatively high efficiency (e.g. and thus converge relatively fast to the optimum, which is particularly relevant where the explored domain is particularly large and offers numerous potential results), thanks to the sparsity of the deformation modes being rewarded at the determining S2. Indeed, this means, in other words, that the determining S2 is performed according to an algorithm (e.g. exact optimization algorithm, or, as more usual, a heuristic or approximate optimization algorithm), which can be any algorithm (e.g. prior arts algorithms can indeed be executed at the determining S2, as appreciated by the skilled person) that tends to involve only a few of the deformation modes provided at S1 in the exploration (and thus in the final solution) and that thus converges relatively fast to a relevant solution (i.e. relatively accurate, with respect to the true geometry of the real object). This can be performed by adding to an optimization program a term that penalizes the final solution involving relatively numerous ones of the deformation modes provided at S1. The method thus allows reaching a relatively accurate result in a relatively fast manner, thereby allowing a relatively high flexibility in the explored deformations and consequently a relatively efficient result even in case of a single 3D measured image of the real object. Also, in an example, the method performs on the basis of the 3D mesh and the measured data solely, excluding any learning (as mentioned with reference to the prior art), and thus the method may consist of S1-S3.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product (i.e. the real object whose representative measured data are input of the method) to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
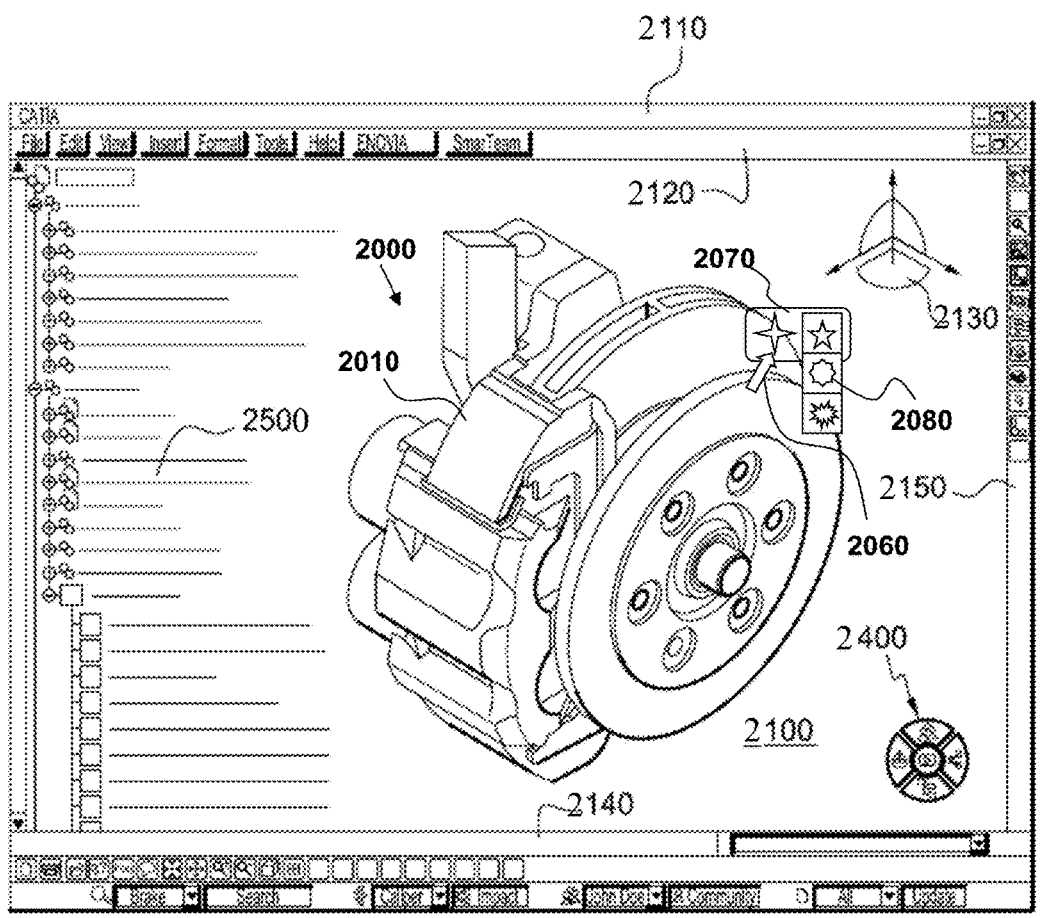
FIG. 2 shows an example of a graphical user interface of the system.

FIG. 2 shows an example of the GUI of the system, wherein the system is a CAD system. In the example, the system displays a CAD modeled object which can derive from the result of the method (e.g. the 3D mesh outputted by the method is eventually converted into a NURBS, and then inserted to assembly 2000), or merely be a workspace from where the method can be launched anytime.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
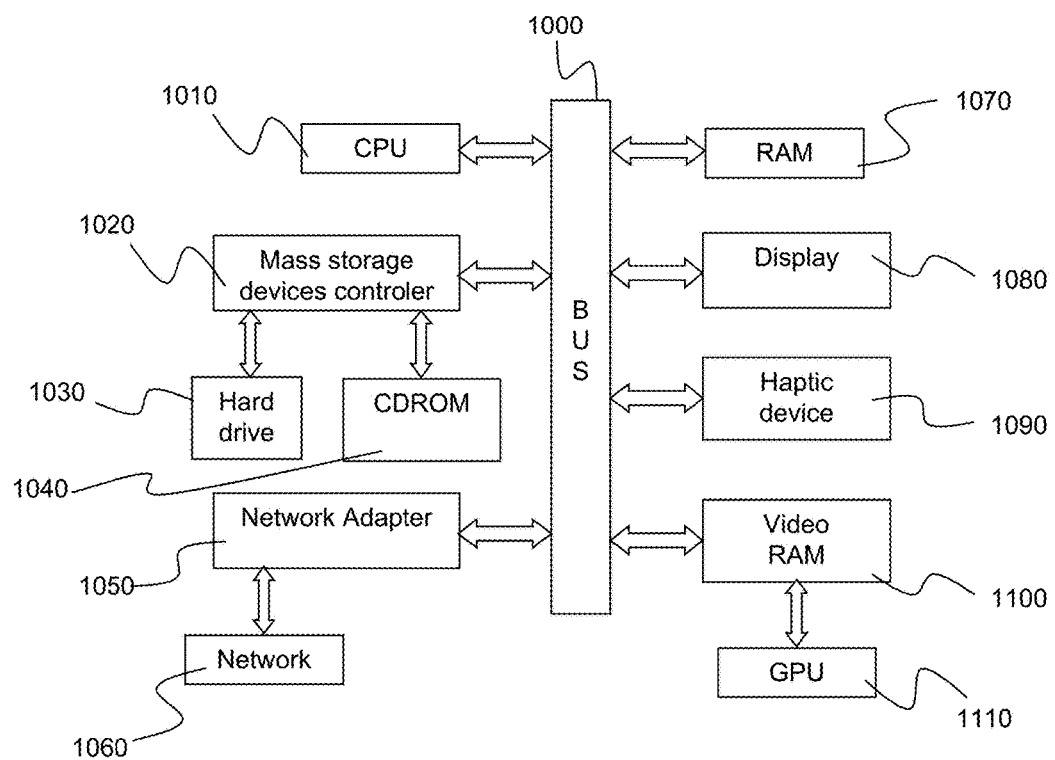
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The 3D reconstruction performed by the method may be part of a 3D design process. "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a consumer good, a part, or an assembly of parts. Because the method improves the design of the modeled object, the method also improves the manufacturing of a product and thus increases productivity of the manufacturing process.

The method is particularly efficient in a context where the real object is a manufacturing product, more particularly when it is a substantially convex and/or a—e.g. at least substantially—non-assembled manufactured product (that is, —e.g. at least substantially—unitarily manufactured, e.g. the product is a molded part, a sheet metal piece part, a forming or thermoforming plastic part, a metal casting part, an extrusion or lamination part such as a metal rolling part, e.g. before potential cut-outs via stamping, machining, milling and/or laser cutting, e.g. with no or negligible later assembly of other part(s)). By "substantially" non-assembled (rather than merely "non-assembled"), it is meant that the product is an assembly of parts (each part being a non-assembled product), where one part has a volume at least twice or four times the volume of the other parts and/or when assembled to one part the other parts present a surface of adjacency with the one part that amounts for at least 10% or 20% of their outer surface. For example, the manufacturing product may be a single product offered as such on the market and not aimed at being assembled with another product to form another complete product. In case a real object is substantially non-convex and/or an assembly of such real objects, the method may be applied independently for each convex and/or assembled unitary portion. Indeed, the approach and the later-provided examples of the method provide particularly accurate result in case the real object features relatively few singularities (which is the case of the parts mentioned above).

The method relates to a way to reconstruct a 3D modeled object based on an initial 3D mesh (also referred to as "template" in the following) that is to be deformed as a function of measured data. The template mesh is any 3D mesh widely known e.g. from the field of CAD (i.e. a particular graph where vertices point to 3D positions and are connected together by non-directed arcs that represent edges—e.g. straight—between the 3D positions, e.g. quad or triangular mesh). Now, the template 3D mesh can be provided in any way and for example it can stem from another (and prior) 3D reconstruction method, the method of FIG. 1 thereby correcting (i.e. adjusting, improving) said other reconstruction (which may have been performed prior to the method of FIG. 1, possibly based on the same measured data). In another implementation, the template 3D mesh can be merely selected manually by a user from a library. The method thereby provides a way to deform this selected template in an optimal manner so as to fit measured data.

In examples, the initial template can be found among different 3D models in a predetermined database, using a predetermined machine learning algorithm trained for a retrieval task. Or the template can be manually selected by the user. The template may be as similar as possible to the real 3D object (different quantitative criteria can be contemplated to capture such similarity), e.g. below a distance threshold with respect to one or more predetermined similarity criterion (a). For example, the template may be smooth where the real object is smooth, and/or straight where the object is angular. Geometrical and/or topological similarity may be contemplated. The template may thus be representative of the real object, for example mostly in the geometrical meaning. The criteria may involve any predetermined 3D distance between the template mesh and the real object, and for example any maximum value for such predetermined distance to be respected. A theoretical mesh representing optimally the real object may be contemplated, and thereby a mesh distance may be involved in the criteria. Distance between two meshes X and Y may be defined as inf(d(T(X),Y) where the min is evaluated over T, which is a rigid motion (rotation and/or translation), and where d(X,Y)=sum d'(x,Y) where the sum is evaluated over all vertices x of X, and d'(x,Y) is the distance of point x to mesh Y (i.e. d'(x,Y)=min where the min is evaluated at all vertices y of Y). In an example, a 3D mesh involving a value of such distance with a theoretic mesh (representative of the 3D modeled object) below a predetermined threshold may thus be pre-selected to the method of FIG. 1. Also, the resolution of the template may be large enough to be able to finely represent the object to reconstruct. In practice, a template mesh having more than 500, or 1000, for example of the order of 5000, vertices evenly spread is large enough. Nevertheless, if the resolution is too low, the method can simply apply a subdivision algorithm.

Thus, the method may in an example comprise a prior selection (manual or automatic or yet semi-automatic) of an input template mesh from a broad class of 3D models. The following papers each disclose a method for a the design of a 3D mesh based on measurements and can thereby each be implemented herein to perform the selection of the template, for example by inputting the measured data of FIG. 1 to any or more of the methods disclosed in those papers: "*Learning Descriptors for Object Recognition and* 3*D Pose Estimation*, by Paul Wohlhart, and Vincent Lepetit, in Computer Vision and Pattern Recognition, 2015", "*Multimodal Deep Learing for Robust RGB-D Object Recognition*, by Andreas Eitel, Jost Tobias Springenberg, Luciano Spinello, Martin Riedmiller, and Wolfram Burgard, in Internation Conference on Intelligent Robots and Systems, 2015", "*Sketch-Based Shape Retrieval*, by Mathias Eitz, Ronald Richter, Tamy Boubekeur, Kristian Hildebrandt, and Marc Alexa, in SIGGRAPH, 2012", and "*Database Assisted Object Retrieval for Real-Time* 3*D Reconstruction*, by Yangyan Li, Angela Dai, Leonidas Guibas, and Matthias Niessner, in EUROGRAPHICS, 2015".

Potentially based on the template mesh (e.g. not at all on the measured data), the method of FIG. 1 provides at S1 (e.g. automatically) a set of deformation modes. This means that an initialization of potential deformation modes is performed (a deformation mode designating a parameterized deformation function of the 3D mesh, that is, a set of functions that take the 3D mesh as input and output a deformed version of the input depending on the values of parameters respective to the mode, e.g. the values of the parameters varying in a continuum of values, the method aiming at finding an optimal composition, including an optimal set of parameters, and thus an optimal sequence of effective deformations for the 3D mesh). Each deformation mode may provide a deformation function, e.g. based on values retained for the parameters that characterize the mode, e.g. at least part of the modes involving more than two (or three or five such parameters). This initialization may thus be a function of the template mesh (e.g. and only of the template mesh), and can amount to contextualize predetermined classes of deformation modes (i.e. evaluate each of one, several or all of a predetermined set of variable deformation modes onto the input of the method, i.e. the template 3D mesh). Obviously, as mentioned earlier the initialization of such deformation modes (and thus the providing S1) need not be effectively performed as an initial computation, but it may be performed interlaced with the later determining S2 (any software implementation that reaches the optimum eventually to be applied at S3 being here contemplated).

At least part or all of the deformation modes may depend on the initial 3D mesh. For example, the deformation modes may depend on the specific topology of the initial 3D mesh. Also, the deformation modes may be sets that depend on an initial and predetermined positioning (e.g. arbitrarily) of the 3D mesh and/or on a reference frame of such positioning (e.g. on the axes and/or origin of such a reference frame, in which case the deformation mode acts differently depending on the position of the 3D mesh in the reference frame). This allows a focused determining S2.

The deformation modes may each preserve topology and regularity of the 3D mesh. In an example provided later, physics eigenmodes and geometric modes are provided at S1 to parameterize the template and are examples that respect such a condition. Nevertheless, many different modes can be used and still yield very good results, all the more if they respect this condition. This condition translates the fact that the parameterization of the template may catch most or all the needed deformations to transform the template into the object to reconstruct. Each deformation mode of the parameterization may be stand-alone, in a sense that it represents a large realistic uncorrelated deformations of the template. The sparse optimization of S2 then optimally select the few modes which explain best the deformation which transforms the template into the object to reconstruct. A mode can be considered to respect these criteria if it affects a large proportion of the vertices of the template (e.g. >10%), it is orthogonal to the other modes for a specified inner product, and/or if the mode is smooth enough, in a sense that if it deforms a vertex, the neighboring vertices are also deformed continuously. In specific, the modes may respect the following condition: the deformation of each vertex of the mesh is continuous with respect to the mode parameters and, for a given value for the parameters of the mode, the Gauss curvature on the surface of the mesh is continuous (i.e. the deformation mode does not introduce discontinuities/breaks on the surface). Any one or several or all of the set of modes provided at S1 may respect any combination or all these conditions.

Within the deformation modes provided, the method determines at S2 a composition of the deformation modes (i.e. a set of values for all the mode parameters, if there is a fixed predetermined sequence of modes to respect in the composition, or additionally such sequence if it is not predetermined and/or fixed). It is here noted again that for one or more—e.g. all—modes a dedicated parameter may capture whether the mode is in the composition or not (or alternatively such information may be captured in any other way during the determining S2). In any case, the composition determined at S2 is the one which optimizes a—e.g. predetermined—program that rewards fit (i.e. penalizes unfit, or large distance) between the 3D mesh as deformed by the composition and the measured data (e.g. with respect to any predetermined 3D-mesh-to-measured-data distance, e.g. a sum of individual distances between each vertex of the mesh and the measured data, e.g. wherein each individual distance is the minimum distance between the vertex and the measured data, which notion is known per se to the skilled person, whether the measured data are provided under the form of a 3D mesh, a point cloud, or any other discrete set of geometrical data representative the real object or yet a continuous such set, for example one or more parameterized surfaces), and that further rewards sparsity of the deformation modes eventually involved in the determined composition (e.g. parameters values of many modes being such that the mode are indeed activated, i.e. perform an effective deformation).

Then, the method comprises applying at S3 the composition to the 3D mesh, which thereby corrects the 3D mesh in an optimal way with respect to the measured data. In examples, the final reconstruction could be compared to a known 3D model of the object to reconstruct in order to measure the performance of the method. Nevertheless, plausibility of the final model may also be taken into account. In examples, a user would rather have a plausible model, even if the reconstruction error is greater, than an accurate but noisy and so unpleasant model. The examples of the method provided below fulfill these criteria particularly well and efficiently (in terms of computing time, with regard to the convergence of S2). For example, a few physics eigenmodes (as explained below) represent such plausibility, nonrealistic modes being discarded by the sparse optimization.

In an example, the set of deformation modes comprises a subset representative of geometrical modes that includes the rigid mode and the 3D scaling mode.

By "representative of", it is here meant that the set of deformation modes includes deformations modes (i.e. the subset) that allow achieving the same results as the compositions of the "represented" modes (through a specific composition). The most straightforward way to implement this is to provide the represented modes as such at S1, but variations may be contemplated as well (for example providing combinations of the represented modes instead of themselves). In a way, equivalence classes of sets of deformation modes may be contemplated (all sets that achieve the same panel of deformations), and any representative of a specific equivalence class is provided at S1. In the following, when it is said that the set of deformation modes comprises a given mode, this can be understood literally or alternatively as meaning that the set of modes actually comprises representation thereof (i.e. one or more modes that achieve via composition the given mode).

Now, the set of deformation modes comprises a subset representative of geometrical modes that includes the rigid mode and the 3D scaling mode in specific. This means that the 3D mesh can be moved in translation and rotation (i.e. rigid motion) in any way so as take part in the composition in order to best fit the measured data (being noted that the initial positioning of the 3D mesh with respect to the measured data may be performed in any way, for example arbitrarily). This also means that the 3D mesh can be scaled (increased and/or decreased) as well (the scaling being performed in any way, with respect to any center/reference, for example the origin of a reference frame where the measured data and the 3D mesh are positioned, being noted that the presence of the rigid motion mode can reposition the 3D mesh at will so as to perform the wanted scaling, or yet a mass center of the 3D mesh). This allows a library where the 3D mesh would be selected (e.g. template library) to be greatly reduced (in terms of the number of templates). Indeed, rigid motion and 3D scaling are deformations most likely to intervene (in most situations) in order to fit the measured data.

Other deformation modes may be contemplated. Notably, the set of deformation modes may further comprise a subset representative of at least one physics mode (e.g. in examples, at least two or at least five—e.g. orthogonal— physics modes). A physics mode is any deformation (i.e. changes in the shape or size of an object) due to a physical constraint, such as an applied force (the deformation energy in this case being transferred through work) or a change in temperature (the deformation energy in this case is transferred through heat). Physics mode may stem from a physics modal analysis of the 3D mesh (more precisely, a physical object represented by the 3D mesh). Such specific deformations prove particularly efficient in the 3D reconstruction context of the method, as tests have shown that they lead to particularly plausible and accurate results. A physics mode contemplated by the method may be a non-linear physics mode. A physics mode contemplated by the method may also be a linear physics mode, defined by the deformation due to the application of an infinitesimal force (in such a case, the amplitude of the mode may be provided by a multiplication with a scalar value—i.e. the parameter of the mode—of a vector that defines the mode). In particular, a physics mode contemplated by the method of this example may be elastic deformation modes. Thus, the method uses the physical concept of elastic and reversible deformation for a totally new purpose, that is, to perform a virtual design, via deforming a 3D mesh so as to fit data measured with a sensor. In particular, a physics mode contemplated by the method may be a hyperelastic deformation mode, for example stemming from the Saint-Venant Kirchhoff model (e.g. an example of application of such a model being provided later). This works particularly well for manufacturing products, where the product is unitarily formed (as explained earlier).

The method thus relates to the field of 3D reconstruction and shape optimization. The method may have many applications in product design, scene modeling, scene understanding, and all domains where it is necessary or useful to precisely build a 3D object with exact geometry using as input the information of a single e.g. photograph. In an example, the method allows to use jointly a physical based object deformation and an optimization on a single RGB-Depth photograph to obtain an accurate parameterized representation of the observed object.

The method overcomes disadvantages of the prior art. Prior art video-based 3D reconstruction pipelines are reliable and generic (such as the method disclosed in paper "Jakob Engel and Thomas Schops and Daniel Cremers— *LSD-SLAM: Large-Scale Direct Monocular SLAM*, CVPR02014"), but have several disadvantages. Reconstructed 3D models are noisy and not watertight, especially with the structure-from-motion analysis algorithms (such as the method disclosed in paper "Yasutaka Furukawa, Brian Curless, Steven M. Seitz and Richard Szeliski—*Towards Internet-scale Multi-view Stereo*, in CVPR 2010"). Reconstructed 3D models are very dense (such as the methods disclosed in papers "Yan Cui et al.: *3D Shape Scanning with a Time-of-Flight Camera*, CVPR2010" and R. "Newcombe et al. *Live Dense Reconstruction with a Single Moving Camera*, IEEE ICCV2011"), and thus not suitable for a lot of industrial applications which require sparse but accurate and watertight models. Moreover, video-based pipelines have the severe disadvantage to require a video or a lot of pictures, which makes the reconstruction process long and complex, and not suitable for many scenes, especially in scenes involving a lot of occlusions. Prior art single view reconstruction pipelines have the following disadvantages. Some require learning process on a huge database (such as the methods disclosed in papers "Oren Frefeld, and Michael J. Black, *Lie Bodies: A Manifold Representation of 3D Human Shape*, in ECCV 2012" and "Yu Chen, and Roberto Cipolla, *Single and Sparse View 3D Reconstruction by Learning Shape Priors*, in CVIU Journal 2011"). Intrinsic properties of the object, such as symmetries, are not preserved (such as the methods disclosed in papers "Prados et al, *Shape from Shading*, in Handbook of Mathematical Models in Computer Vision, 2006", "Toeppe et al, *Fast and Globally Optimal Single View Reconstruction of Curved Objects*, in CVPR, 2012", "Barron et al, *Shape, Illumination and Reflectance from Shading*, in EECS, 2013"). Not generic and/or shapes are constrained (such as the methods disclosed in papers "Oren Frefeld, and Michael J. Black, *Lie Bodies: A Manifold Representation of 3D Human Shape*, in ECCV 2012", "Yu Chen, and Roberto Cipolla, *Single and Sparse View 3D Reconstruction by Learning Shape Priors*, in CVIU Journal 2011", "Zheng et al, *Interactive Images: Cuboid Proxies for Smart Image Segmentation*, in SIGGRAPH, 2012", "Kester Duncan, Sudeep Sarkar, Redwan Alqasemi, and Rajiv Dubey, *Multi-scale Superquadric Fitting for Efficient Shape and Pose Recovery of Unknown Objects*, in ICRA 2013", "Panagiotis Koutsourakis, Loïc Simon, Olivier Teboul, Georgios Tziritas, and Nikos Paragios, *Single View Reconstruction Using Shape Grammars for Urban Environments*, in ICCV 2009"). Single Depth Frame Reconstruction algorithms relying on the learning of a space of shapes adapted to a specific class of objects are sometimes efficient, but require a huge database of all the plausible 3D objects belonging to the class of objects one wants to reconstruct in order to learn its space of plausible shapes, which is a very strong constraint. Single Depth Frame Reconstruction algorithms imposing a user-defined space of shapes (such as superquadrics shapes) or a user-defined grammar, are very limited, inaccurate, and do not perform well on complex shapes. Moreover, a new algorithm must be designed for every new class of objects, defining a new space of shapes and a new optimization scheme adapted to this space. The other kinds of algorithms, for instance those exploiting the contours, textures, silhouettes or shadings, are even less inefficient, and do not guarantee to preserve intrinsic properties of the object such as symmetries or topology. The method may overcome several or all such disadvantages.

The method is well-adapted for example for current consumer RGB-Depth sensors, which provide very noisy depth maps, especially with small objects, such as consumer goods. It is very difficult to use a single depth map to reconstruct such objects. But it is easy to find an approximate mesh representing a typical object of the same class of the object one wants to reconstruct. For instance, if one wants to reconstruct a shampoo (such real object being the running example of the later-provided example implementation of the method, with reference to the figures), it is very easy to provide a 3D mesh of a generic shampoo.

In an example, the method thus builds on the idea to use such a 3D model, called a template mesh, and deform it (to transform it) into the object to reconstruct. Thus the method guarantees a good topology for the final template. The method builds on the recognition that there is an infinite number of ways to deform a mesh, but only a few yield natural and plausible deformations. For instance, only a few deformations allow a generic template to be morphed into other shampoos. From a mathematical point of view, the method makes the deformed templates stand on the subspace of the class of objects to reconstruct, e.g. the deformations applied to a generic shampoo should lead to plausible shapes of shampoos. One prior art way to find these natural deformations is to learn them using a database with plenty of objects of the same class. This is a very strong constraint.

The method departs from the prior art, in examples, by defining generic deformations, regardless of the class of the object to reconstruct, e.g. using physics eigenmodes as mentioned earlier. This defines enough deformations to represent all the plausible deformations. The method may thus form an automatic sparse optimization scheme which automatically selects the best deformations to represent the object to reconstruct. Thus, the method combines the advantages of using a single template per class, preserving its good topology, and leading to an accurate geometry regardless the object of the template's class to reconstruct, without the disadvantages of the learning-based algorithms, which require a lot of aligned meshes of the same class, and are thus not scalable.

In examples, unlike state of the art algorithms, the method is generic, preserves the intrinsic properties of the object to reconstruct such as symmetries, and may require and work with only a single 3D mesh belonging to the class of objects one wants to be able to reconstruct (for instance a single mesh of a bottle if the method is applied to reconstruct any bottle using only a single depth frame) instead of a dataset of several hundreds of 3D meshes of this class.

An example of the method builds on the idea of having a RGB-Depth frame of the object to reconstruct, and a database of CAD models representing each class of the objects one wants to reconstruct in 3D. In examples, the methods implements two main specificities, belonging to the reconstruction step itself: a new method to model and deform a template mesh to fit the object to reconstruct, the "modes modeling" provided at S1, as well as a new sparse optimization scheme which automatically selects and optimizes a small number of deformation modes sufficient to deform and align the template onto the RGB-Depth frame, the "sparse optimization" performed within S2.

Figure 4:
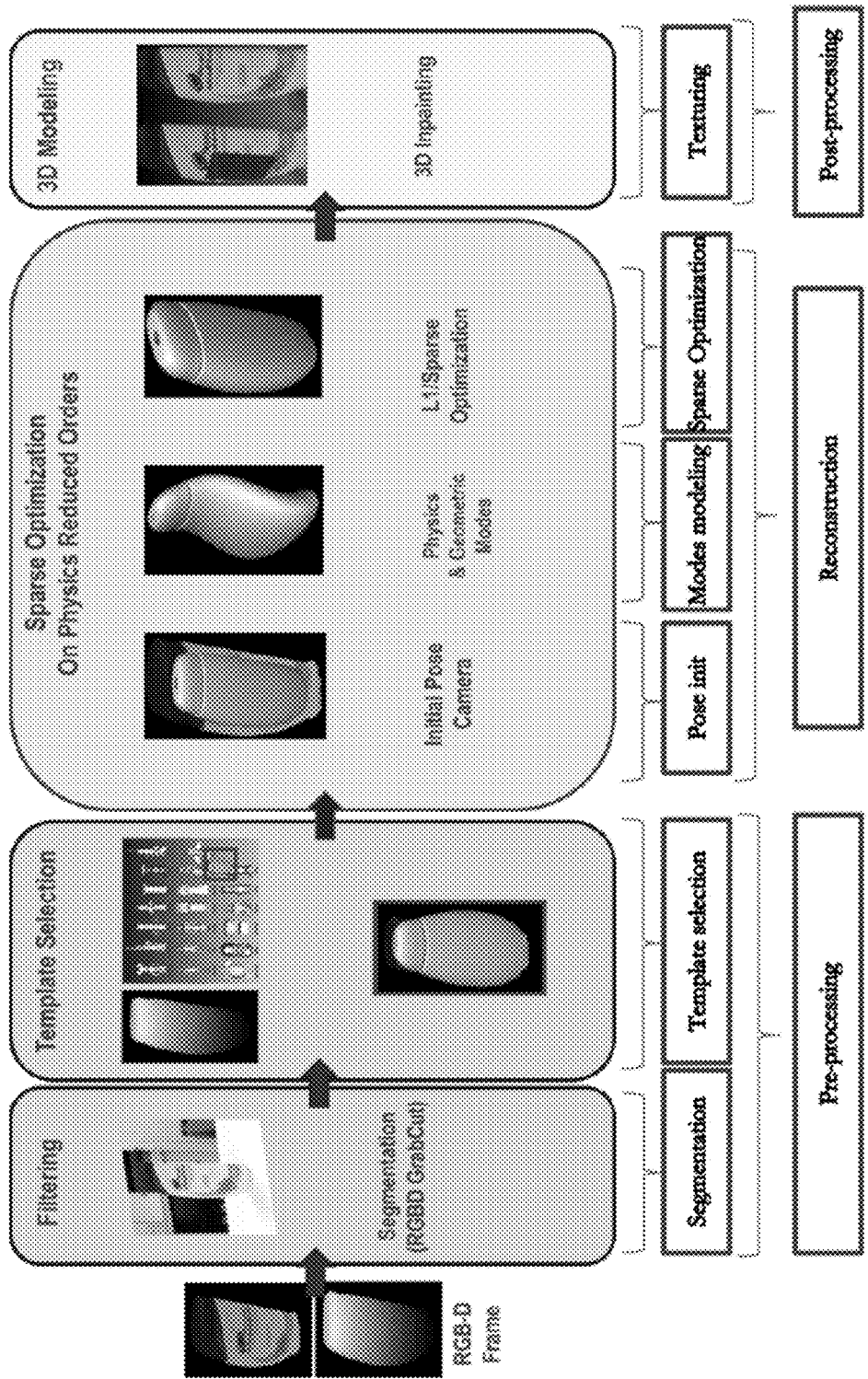
FIGS. 4-13 illustrate the method.

An example of the whole 3D reconstruction pipeline is now discussed, with reference to the flowchart of FIG. 4, where the example of the method is applied to the reconstruction of a 3D modeled object that represents a shampoo bottle (any other type of real object, as disclosed earlier, being contemplable). In the example, each pixel of a depth map (this could however be another type of sensed data providing 3D-related information) contains the depths to the camera from the corresponding 3D point which was projected onto his pixel. It is easy to back-project each pixel of a depth map into a 3D point, and thus a depth map is equivalent to a 3D point cloud. To perform the projections and back-projections in the various steps of the implementation of the example, the method can either use generic intrinsic parameters, or accurate intrinsic parameters computed by calibrating the sensor which captured the frame. Using generic intrinsic parameters yields good results because the method may use only one frame.

The (optional) pre-processing stage of the example is now discussed.

The (optional) segmentation is first discussed.

This pre-processing step first consists in segmenting the RGB-Depth frame, in order to extract the silhouette of the object to reconstruct. A lot of algorithms can be used for this purpose, such as K-Means, Region-merging, Normalized cuts, and/or Snake. In an implementation, the method may use the GrabCut algorithm ("Carsten Rother, Vladimir Kolmogorov, and Andrew Blake, GrabCut—Interactive Foreground Extraction using Iterated Graph Cuts, in SIGGRAPH 2004") to segment the RGB frame. GrabCut is very robust, automatic, and the user just needs to draw a box around the object to segment. The algorithm does not need to be fine hand-tuned, the algorithm has only one parameter to choose.

Moreover, if the segmentation fails, it is easy for the user to interactively correct the segmentation with this algorithm. Any other segmentation algorithm would suit. The intermediate result of this segmentation is an RGB frame, where each pixel belonging to the background is set to color black (0,0,0). In order to segment the depth frame, in an example the method may use the segmentation of the RGB frame. In practice, the method may project the 3D points of the depth map onto the RGB frame, and if the point is projected onto the background of the RGB frame, the corresponding pixel of the depth frame is also set to (0,0,0) as it also belongs to the background. The method could also use the GrabCut algorithm (or another segmentation algorithm) to directly segment the depth frame. Segmenting the RGB frame first and transposing this segmentation onto the depth frame is particularly robust.

A template selection is now discussed.

This second stage of the pre-processing stage of the example consists in the template selection. The template mesh may be a mesh which belongs to the same class of objects as the object that the method aims to reconstruct in 3D. One can consider the template as an approximate mesh, with similar topology, of the object to reconstruct. The reconstruction step deforms and optimizes this template to fit the depth frame. In an implementation, the method may comprise the following. The user may tag the object to reconstruct in order to select an appropriate template in a database of 3D models. The method could automate this task with a shape matching algorithm, able to find in the database the nearest template to the point cloud given by the depth frame. The template may have the same approximate size as the object to reconstruct, but a perfect scale is not needed, since the scale of the template may be optimized in the optimization step (thanks to the scaling mode notably). Once the template is selected, the example method centers the template and applies a principal component analysis to align the principal axes of the template onto the x-y-z axes. To do so, the method may diagonalize the empirical covariance matrix of the centered point cloud constituting the template, and apply the rotation which aligns the eigenvectors with x-y-z axes. The alignment may be made such that the maximal principal component is rotated on the x axis.

The reconstruction stage of the example is now discussed.

The pose initialization step (optional) of the reconstruction stage of the example is now discussed.

The template may then be aligned onto the depth frame. This alignment can be made manually by the user in an implementation, or it can be provided by a rigid shape matching algorithm, using 3D features, as for example disclosed in paper "Luis A. Alexandre, 3D *Descriptors for Object and Category Recognition: a Comparative Evaluation*, in IROS 2012", "Radu B. Rusu, Nico Blodow, and Michael Beetz, Fast Point Feature Histograms (FPFH) for 3D Registration, in ICRA 2009" or paper "Frederico Tombari, Samuele Salti, and Luigi Di Stefano, *Unique Signatures of Histograms for local Surface Description*, in ECCV 2010". A coarse alignment is already good enough, as the pose will be anyway optimized in the optimization step.

An example of the providing S1 of the method, also referred to as modes modeling is now discussed.

Let T=(V,E) be the template mesh (centered, aligned, and whose pose is already initialized), with E the edges of the template, and V its vertices. Let n be the number of vertices of the template. Then V is a vector of size 3n because each vertex has three coordinates (x,y,z). Let l be the typical length of the template. Let $x_{max} = \max_{i \% 3=1} |V(i)|$. In this example, vector V—of size 3n and defining the mesh—is ordered vertex-by-vertex rather than coordinate-by-coordinate, such that $V=(x_1,y_1,z_1,\ldots,x_n,y_n,z_n)$, and this each time $i \% 3=1$, $V(i)$ corresponds to the x coordinate of one of the vertices of the mesh (if the method indexes V starting from 1 rather than e.g. 0). Moreover, x may correspond to the largest length axis of the template (as mentioned in the template selection example provided above).

The method may provide at S1 (representatives of) two kinds of deformation modes: physics modes, and geometric modes. Each mode is a function from $I \times \mathbb{R}^{3n}$ to $\mathbb{R}^{3n}$, where I is the set of amplitude parameters of the mode. The modes are then applied to the template by composition, for a given set of parameters. The goal is to find (at later S2) the best parameters for each mode, in order to deform optimally the template into the object to reconstruct.

Physics modes may be computed by a classic linear modal analysis on the template. This is well-known from the field of mechanical engineering, and methods to do such a modal analysis are provided in details in paper "Jernej Barbic, and Doug L. James, *Real-Time Subspace Integration for St. Tenant-Kirchhoff Deformable Models*, in SIGGRAPH 2005", paper "Klaus Hildebrandt, Christian Schulz, Christoph von Tycowitz, and Konrad Polthier, *Eigenmodes of Surface Energies for Shape Analysis*, in Advances in Geometric Modeling and Processing 2012", and paper "Eftychios D. Sifakis, FEM Simulation of 3D Deformable Solids: A Practitioner's Guide to Theory, Discretization and Model Reduction, in SIGGRAPH 2012 Course". The teaching of these papers regarding the determination of the physics mode can be applied by the present method.

The following briefly sums up the main ideas implemented in the example. First the method may define a discrete strain energy $E(U)$ on the template, where $U \in \mathbb{R}^{3n}$ is the deformation vector of the template mesh, i.e. if the method deforms the template with the vector U such that the new template has $V+U$ for coordinates, the deformation energy associated is $E(U)$. Defining E is equivalent to assigning a specific material to the template. The internal forces at each vertex are then $F(U)=-\text{grad } E(U)$. For a linear modal analysis, the method may linearize the forces at the undeformed position $(U=0)$ and solve for the eigenvectors (called in this case "eigenmodes") of the standard following generalized eigenvalue problem: $K(U)=\lambda M U$ where $K(U)$ is the hessian matrix of $F(U=0)$, and is usually called the stiffness matrix, and M is the mass matrix and can be for the sake of a straightforward providing S1 be selected as the identity matrix (both well-known objects). This way, the subset of at least one physics mode may include at least one (material) eigenmode.

Now, the subset representative of at least one physics mode may include a (e.g. predetermined) number of the lowest eigenvectors. In the example, the method may select the first eigenvectors (of lowest eigenvalues) $U_1, \ldots, U_p$, normalized for $L_\infty$ norm, and define the p first deformation modes, as $f_i(\alpha_i, V)=V+\alpha_i U_i$, with $\alpha_i \in$ $$A = \left[-\frac{l}{5}; \frac{l}{5}\right],$$

where l designates the diameter (i.e. largest inner length) of the template $$\left(A = \left[-\frac{l}{5}; \frac{l}{5}\right]\right)$$

being an arbitrary example of a constraint set to the variable parameter $\alpha_i$ of the modes in order to help avoiding convergence toward local minima, other constraint values being contemplated to achieve such purpose, other values being retainable). Typically, p may be higher than 2 or 5, and/or lower than 50 or 20 (an upper bound for p being of relatively little importance regarding the speed of the method, thanks to the sparse character of the optimization, but helping avoiding local minima), for example of the order of 10 (tests were performed using 10 exactly). Such a configuration allows a particularly efficient convergence of the optimization toward a particularly plausible result, avoiding relatively well any trapping in local minimum.

In particular, the specific material assigned to the template in the above computations may be a Saint Venant-Kirchhoff material. This very well-known material model leads to a particularly plausible reconstruction, but other materials can be contemplated. The method may indeed use the strain energy of a Saint Venant-Kirchhoff material, with a mass matrix proportional to the identity matrix. The classical discretization details for this material are well-known and provided by paper "Jernej Barbic, and Doug L. James, *Real-Time Subspace Integration for St. Tenant-Kirchhoff Deformable Models*, in SIGGRAPH 2005" and paper "[Sifakis2012]: Eftychios D. Sifakis, *FEM Simulation of 3D Deformable Solids: A Practitioner's Guide to Theory, Discretization and Model Reduction*, in SIGGRAPH 2012 Course". The teaching of these papers regarding the determination of the physics mode for a Saint Venant-Kirchhoff material can be applied by the present method.

The method may also provide at S1 geometric modes that are defined as plausible deformations not caught by physics eigenmodes. This enriches (in a smart manner) the set of deformation modes provided at S1 and explored at S2, and leads to a more robust result.

In an example, the method provides several such geometric modes.

A first geometric deformation function provided by the example is the simple 3-dimensional scaling mode: $g_1(\beta, V)=((1+\beta_1)I_1+(1+\beta_2)I_2+(1+\beta_3)I_3)V$, where $I_1=\text{diag}((1,0,0), (1,0,0), \ldots, (1,0,0))$, $I_2=\text{diag}((0,1,0), (0,1,0), \ldots, (0,1,0))$, $I_3=\text{diag}((0,0,1), (0,0,1), \ldots, (0,0,1))$, and $\beta \in B=[-0.8; 0.8]^3$.

A second geometric function is non-uniform scaling mode defined as $g_2(\gamma,V)=V+\gamma_1 U'_1+\gamma_2 U'_2+\gamma_3 U'_3$, where $$U'_j(i) = 1_{j=1+i \% 3} \text{sign}(V(i))|V(i)|^{\frac{1}{4}},$$

and $$\gamma \in C = \left[0; \frac{l}{5}\right]^3.$$

This mode acts as a non-uniform scaling (the scaling is intensified close to 0).

A third geometric mode is a polynomial deformation mode, e.g. defined by 4 polynomials:

$$h_0(\delta_0, V) = V + \begin{pmatrix} 0 \\ \left(\delta_{0,0} + \cdots + \delta_{0,d}\left(\frac{V(1)}{x_{max}}\right)^d\right) \cdot V(2) \cdot 1_{sign(V(2))>0} \\ 0 \\ \vdots \\ 0 \\ (\delta_{0,0} + \cdots + \delta_{0,d} V(3n-2)^d) \cdot V(3n-1) \cdot 1_{sign(V(3n-1))>0} \\ 0 \end{pmatrix},$$

$$h_1(\delta_1, V) =$$

$$V + \begin{pmatrix} 0 \\ \left(\delta_{1,0} + \cdots + \delta_{1,d}\left(\frac{V(1)}{x_{max}}\right)^d\right) \cdot V(2) \cdot 1_{sign(V(2))<0} \\ 0 \\ \vdots \\ 0 \\ \left(\delta_{1,0} + \cdots + \delta_{1,d}\left(\frac{V(3n-2)}{x_{max}}\right)^d\right) \cdot V(3n-1) \cdot 1_{sign(V(3n-1))<0} \\ 0 \end{pmatrix},$$

$$h_2(\delta_2, V) = V + \begin{pmatrix} 0 \\ 0 \\ \left(\delta_{2,0} + \cdots + \delta_{2,d}\left(\frac{V(1)}{x_{max}}\right)^d\right) \cdot V(3) \cdot 1_{sign(V(3))>0} \\ \vdots \\ 0 \\ 0 \\ \left(\delta_{2,0} + \cdots + \delta_{2,d}\left(\frac{V(3n-2)}{x_{max}}\right)^d\right) \cdot V(3n) \cdot 1_{sign(V(3n-1))>0} \end{pmatrix},$$

$$h_3(\delta_3, V) = V + \begin{pmatrix} 0 \\ 0 \\ \left(\delta_{3,0} + \cdots + \delta_{3,d}\left(\frac{V(1)}{x_{max}}\right)^d\right) \cdot V(3) \cdot 1_{sign(V(3))<0} \\ \vdots \\ 0 \\ 0 \\ \left(\delta_{3,0} + \cdots + \delta_{3,d}\left(\frac{V(3n-2)}{x_{max}}\right)^d\right) \cdot V(3n) \cdot 1_{sign(V(3n))<0} \end{pmatrix},$$

where $\delta_i \in D = [-1; 1]^{d+1}$. In an implementation, one may take polynomials of degree $d=2$.

Another geometric function of the example is a rigid mode which allows to translate and rotate the template:

$$k(\omega, t, V) = \begin{pmatrix} Rot(\omega)V(1:3) + t \\ \vdots \\ Rot(\omega)V(3n-2:3) + t \end{pmatrix},$$

where t is the translation vector, and $Rot(\omega)$ the rotation matrix made the twist vector $\omega$: the norm of $\omega$ is the angle of rotation, and the normalized vector is the axis of rotation. In our implementation $$(\omega, t) \in E = [-0.3; 0.3]^3 \times \left[-\frac{l}{2}; \frac{l}{2}\right]^3.$$

It is noted that, unlike for the physics modes, the above definitions of the geometric modes require the template to be aligned on its principal axes, as the definitions/parameters of the geometric modes refer to them. The definitions can however be adapted in case other alignments are contemplated. Also, all the modes have the specificity that when the amplitude is equal to 0, the deformation is null (in other words, in this example, the amplitude is the parameter that determines whether the mode is truly used in the final composition, the determination S2 thus penalizing a relatively high number of amplitudes being different from 0).

The set provided at S1 may thus comprise any combination of the all the above-mentioned modes (e.g. any number of physics mode and/or any one(s) of the four geometric deformation modes listed), or any representative set (i.e. any set of modes allowing exactly the same results as said combination.

In an example, the final deformation function of the template V is a composition of all these modes which may be the following (notice that because of the nonlinear modes, the order of composition can lead to different results, a specific order being retained in the present example, other orders being retainable): $f(\theta, V) = k(\omega, t, .) \circ h_3(\delta_3, .) \circ \ldots \circ h_0(\delta_0, .) \circ g_2(\gamma, .) \circ g_1(\beta, .) \circ f_p(\alpha_p, .) \circ \ldots \circ f_1(\alpha_1, .)(V)$, where $\theta = (\alpha_1, \ldots, \alpha_p, \beta, \gamma, \delta_0, \ldots, \delta_3, \omega, t) \in I = A^p \times B \times C \times D^4 \times E$. The template is parameterized by #1 parameters, that is $p+3+3+4(d+1)+3 = p+4(d+1)+9$ parameters. In the implementation of the example, with $d=2$ and $p=10$ there are thus 31 parameters which completely control the template.

Because the number of vertices is n, the maximal number of degrees of freedom is 3n, and typically n>1000. The parameterization of the example allows controlling the template with very few parameters. Moreover, this parameterization intrinsically preserves topology and regularity. The template can only be deformed in a coherent and plausible manner. This is why the example of the method is very powerful for 3D reconstruction, even with a single frame. Also notice that the definitions provided above ensure that $f(0, V) = V$.

An example of the Sparse Optimization performed at S2 is now discussed, in line with the above example.

The example allows finding the best parameters θ to fit the template onto the depth frame. The idea is to define an energy which will be minimal when the deformed template best fits the depth frame. Let us denote F the depth frame. The method may consider an energy as a nonlinear least squares problem $e(\theta) = \Sigma_{x,y} \max([F(x,y) - \pi(f(\theta,V))(x,y)]^2, th)$ where (x,y) denotes a pixel, π the function which computes the depth map of the deformed template using the intrinsic parameters of the input depth frame, and th a threshold to bound the error for each pixel because of the background depth which was set to 0 in the segmentation step. Any other energy may be contemplated. For example, a robust least squares energy and/or an M-estimators energy may alternatively or additionally be contemplated. For example, $\Sigma_{x,y} \max([F(x,y) - \pi(f(\theta,V))(x,y)]^2, th)$ can be replaced by $\Sigma_{x,y} h(x,y,\theta)$, where h is a positive function which varies in the same direction as $|F(x,y) - \pi(f(\theta,V))(x,y)|$ for a fixed (x,y) (e.g. which may mean that h becomes small when the template is superposed on the depth map for a given (x,y) pixel.

Enough deformation modes were provided at S1 to allow the template to be deformed to fit the depth frame. Nevertheless, it is very unlikely that all these modes need to be used to deform the template into the object the method is reconstructing. If the method directly minimizes the energy e, an overfitting phenomenon might appear, as all modes may be involved in the deformation ($\theta(i) \neq 0$ $\forall$i). In such case, the template will use all its degrees of freedom (31 in our case) and overfit the depth frame. The method may rather find the few number of modes which prevent overfitting and are sufficient to transform the template into the object to reconstruct.

Finding the fewest number of modes which can describe such a deformation is a difficult problem, highly dependent on the object to reconstruct. This is why the method uses a powerful framework, called sparse optimization, so as to leave to the optimization the task of automatically selecting the best modes which allow the template to fit the depth frame. In particular, the method of the example uses group-sparsity to discard non-meaningful modes, which could overfit the noise of the depth map at the cost of a regularity loss and a non-plausible shape regarding the object to reconstruct. Thus the regularized energy that the method actually minimizes is the following:

$$e'(\theta) = e(\theta) + \mu\varphi(\theta)$$

where the regularization term $$\varphi(\theta) = \left( \sum_{i=1}^{p} \left| \frac{\alpha_i}{s(A)} \right| + \sum_{i=0}^{3} \sqrt{\frac{1}{d+1} \sum_{j=0}^{d} \left\| \frac{\delta_{i,j}}{s(D)} \right\|^2} \right),$$

and the function s(J)=max(|inf J|, |sup J|) allows to rescale each parameter between [−1; 1] (the second term of the sum intervening if geometric modes different from rigid motion and 3D scaling are in the set provided at S1).

The exact role of the regularization term $\varphi(\theta)$, called a group-sparsity inducing norm or group-Lasso penalty, is detailed and explained in textbook "*Sparse Modeling for Image and Vision Processing, Foundations and Trends in Computer Graphics and Vision*, Mairal, 2014". The goal of $\varphi$ is to enforce sparcity, which means enforces the coefficients $\alpha_i$ and the vectors $\delta_i$ to remain null. The greater $\mu$ is, the more coefficients will remain null. Notice that the method of the example only regularizes the physics eigenmodes, and the polynomial geometric modes. Indeed, the method may avoid enforcing sparsity to the other geometric modes (as one can consider to be involved in the deformation step whatever the object to reconstruct is). This optimization problem intrinsically selects the most appropriate physics eigenmodes and polynomial geometric modes to transform the template into the object to reconstruct.

To minimize the energy e'($\theta$), the method could linearize e($\theta$) and apply the algorithms described in textbook "*Sparse Modeling for Image and Vision Processing, Foundations and Trends in Computer Graphics and Vision*, Mairal, 2014". However, the function $\pi$ is highly complex and it is difficult to get an analytic close formula of its gradient. In practice the method may rather base upon the Z buffer capability of a low-level graphics API such as OpenGL to apply function $\pi$. The method could use finite differences to estimate the derivatives of e($\theta$). Nevertheless, the method should rather use a good initial estimate of $\theta$ to converge towards a good local minimum. This is why in an example the method implements a Nelder-Mead scheme (such as disclosed in paper "John Nelder, and Roger Mead, *A Simplex Method for Function Minimization*, in Computer Journal 1965"), which is a semi local-global optimization algorithm, and allows the method to start with the initial guess $\theta$=0 and still converge towards a good solution.

In an implementation, the method uses an initial simplex size of 0.2 (in the rescaled parameters space), th=30 mm, $\mu$=150 mm$^2$, and the method starts by minimizing only the parameters $\beta$, $\gamma$, $\omega$, t (thus $\varphi(\theta)$ remains null during this first step), then the method minimizes over $\alpha$ and $\delta$, and finally the method minimizes over all the parameters with th=15 mm.

The (optional) "post-processing" stage of the method of the example is now discussed. This post-processing is a texturing. A last step may indeed be to project the RGB frame onto the deformed template in order to get a textured 3D model of the object to reconstruct.

Figure 5:
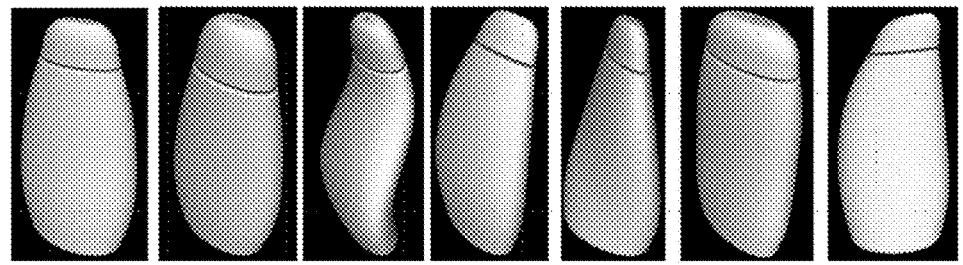
Figure 6:
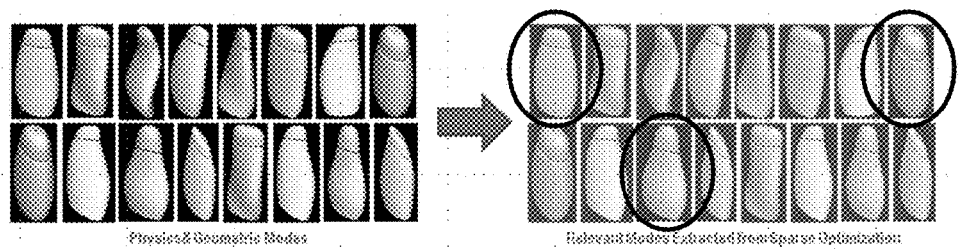
Figure 7:
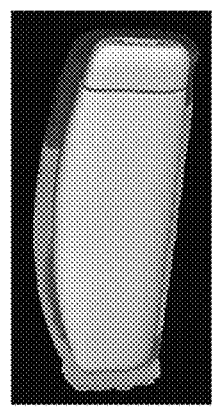
Figure 8:
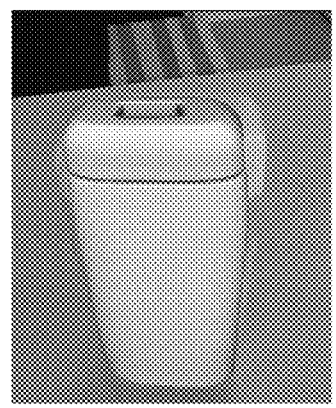
Figure 9:
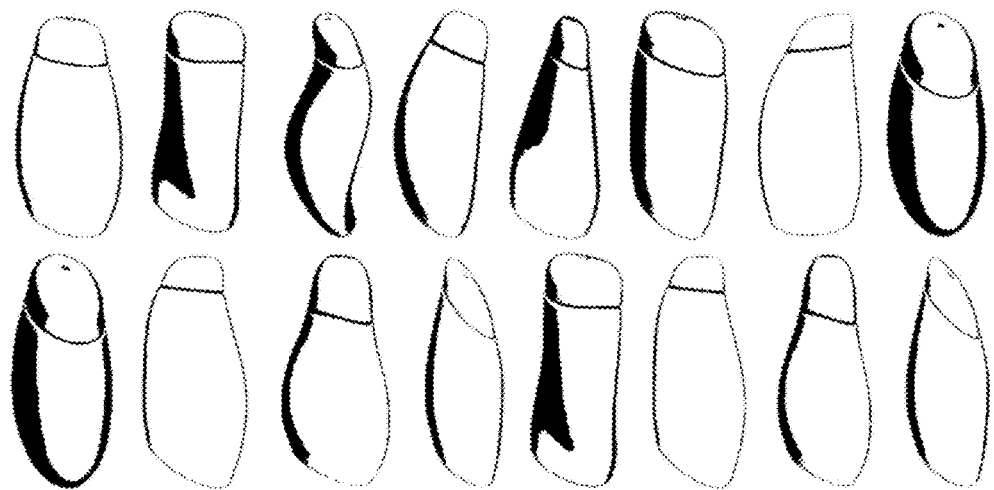
Figure 10:
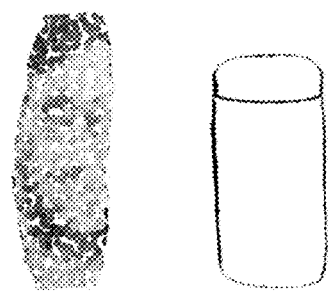
Figure 11:
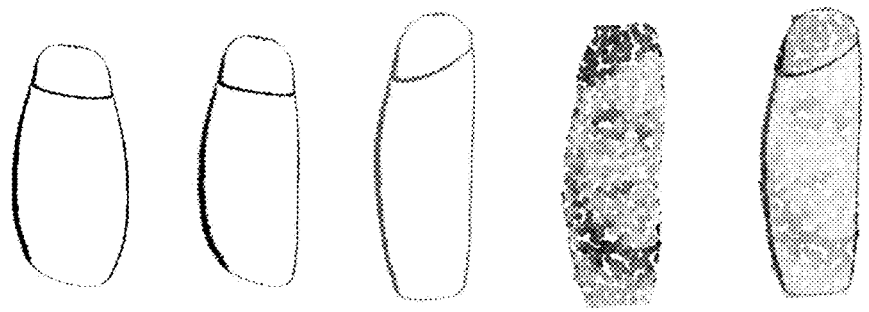
Figures 12, 13:
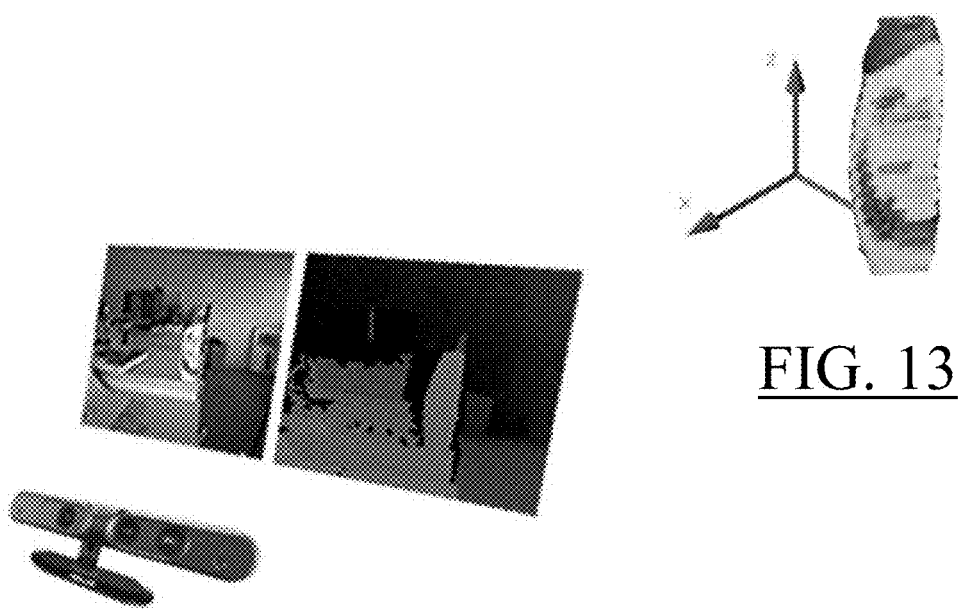

FIGS. 5-13 illustrate a test of an implementation of the example discussed with reference to FIG. 4. Meshes are represented by a fitting surface on the figures, for the sake of more clarity. FIG. 5 shows the initial template (leftmost mesh), and how some physics deformation modes act on it (other meshes). FIG. 6 shows how the sparse optimization of S2 extracts the (three) most relevant physics or geometric modes. FIGS. 7-8 show some results of the deformed initial template which fit two different shampoos. FIG. 9 illustrates physics and geometric modes. FIG. 10 shows an initial point cloud, provided from depth camera, and the associated template (possible inputs of the method). FIG. 11 illustrates template optimization (in a sequential optimization example). FIGS. 12-13 show a real scene caption with an RGB-depth sensor. FIG. 12 shows the RGB image and FIG. 13 shows a depth image of the shampoo bottle present in the real scene.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for reconstructing a 3D modeled object that represents a real object, the real object being a manufacturing product or part, from a 3D mesh and measured data representative of the real object, the method comprising:

obtaining the measured data via one or more physical signal sensors based on a physical instance of the real object;

selecting the 3D mesh from a template library;

providing a set of deformation modes, a deformation mode being a parameterized deformation function of the 3D mesh, the parameterized deformation function of the 3D mesh being a set of functions that take the 3D mesh as input and output a deformed version of the input depending on values of respective parameters, the values of the respective parameters each varying in a respective continuum, the set of deformation modes comprising a subset representative of geometrical modes that includes a rigid mode and a 3D scaling mode, the set of deformation modes further comprising a subset representative of at least one physics mode;

determining a composition of the set of deformation modes which optimizes a program that explores deformation modes and/or values of variable parameters of deformation modes, that rewards fit between the 3D mesh as deformed by the composition and the measured data, and that further rewards sparsity of deformation modes of the set of deformation modes involved in the determined composition; and applying the composition to the 3D mesh.

2. The method of claim 1, wherein the subset of at least one physics mode includes at least one material eigenmode.

3. The method of claim 2, wherein a material of the material eigenmode is a Saint Venant-Kirchhoff material.

4. The method of claim 3, wherein the subset representative of the at least one physics mode includes a number of lowest eigenvectors.

5. The method of claim 2, wherein the subset representative of the at least one physics mode includes a number of lowest eigenvectors.

6. The method of claim 1, wherein the program comprises a term of the type $$\mu\left(\sum_{i=1}^{p}\left|\frac{a_i}{\max(|\inf A \text{ }\shortparallel\text{ } \sup A|)}\right|\right)$$

where coefficients $a_i$ are the coefficients of the at least one physics mode, where p is an integer, A is a real number, and $\mu$ is a real number.

7. The method of claim 1, further comprising manufacturing a product represented by the reconstructed 3D modeled object, the method producing the product based on the 3D modeled object.

8. A non-transitory computer readable storage medium having recorded thereon a computer program, the computer program including instructions for performing a computer-implemented method for reconstructing a 3D modeled object that represents a real object, from a 3D mesh and measured data representative of the real object, the method comprising:

obtaining the measured data via one or more physical signal sensors based on a physical instance of the real object; selecting the 3D mesh from a template library;

providing a set of deformation modes, a deformation mode being a parameterized deformation function of the 3D mesh, the parameterized deformation function of the 3D mesh being a set of functions that take the 3D mesh as input and output a deformed version of the input depending on values of respective parameters, the values of the respective parameters each varying in a respective continuum, the set of deformation modes comprising a subset representative of geometrical modes that includes a rigid mode and a 3D scaling mode, the set of deformation modes further comprising a subset representative of at least one physics mode;

determining a composition of the set of deformation modes which optimizes a program that explores deformation modes and/or values of variable parameters of deformation modes, that rewards fit between the 3D mesh as deformed by the composition and the measured data, and that further rewards sparsity of deformation modes of the set of deformation modes involved in the determined composition; and applying the composition to the 3D mesh.

9. A computer system comprising a processor coupled to a memory, the memory having recorded thereon a computer program, the computer program including instructions for performing a computer-implemented method including:

obtaining the measured data via one or more physical signal sensors based on a physical instance of the real object;

selecting the 3D mesh from a template library;

providing a set of deformation modes, a deformation mode being a parameterized deformation function of the 3D mesh, the parameterized deformation function of the 3D mesh being a set of functions that take the 3D mesh as input and output a deformed version of the input depending on values of respective parameters, the values of the respective parameters each varying in a respective continuum, the set of deformation modes comprising a subset representative of geometrical modes that includes a rigid mode and a 3D scaling mode, the set of deformation modes further comprising a subset representative of at least one physics mode;

determining a composition of the set of deformation modes which optimizes a program that explores deformation modes and/or values of variable parameters of deformation modes, that rewards fit between the 3D mesh as deformed by the composition and the measured data, and that further rewards sparsity of deformation modes of the set of deformation modes involved in the determined composition, and applying the composition to the 3D mesh.

* * * * *

UNITED STATES PATENT AND TRADEMARK OFFICE
CERTIFICATE OF CORRECTION

PATENT NO. : 9,978,177 B2
APPLICATION NO. : 15/391950
DATED : May 22, 2018
INVENTOR(S) : Eloi Mehr and Vincent Guitteny Page 1 of 1

It is certified that error appears in the above-identified patent and that said Letters Patent is hereby corrected as shown below:

In the Claims

In Claim 6, Column 25, Lines 21-24, please remove the term:

" $\mu\left(\sum_{i=1}^{p}\left|\frac{\alpha_i}{\max(|inf A|, |supA|)}\right|\right)$ "

And insert the following term:

-- $\mu\left(\Sigma_{i=1}^{p}\left|\frac{\alpha_i}{\max(|in fA|, |supA|)}\right|\right)$, --

Signed and Sealed this
Seventh Day of August, 2018

Andrei Iancu
*Director of the United States Patent and Trademark Office*